No. 895,632. PATENTED AUG. 11, 1908.
C. J. HARRIS.
COLLAPSIBLE FOOT REST FOR VEHICLES.
APPLICATION FILED MAY 22, 1907.
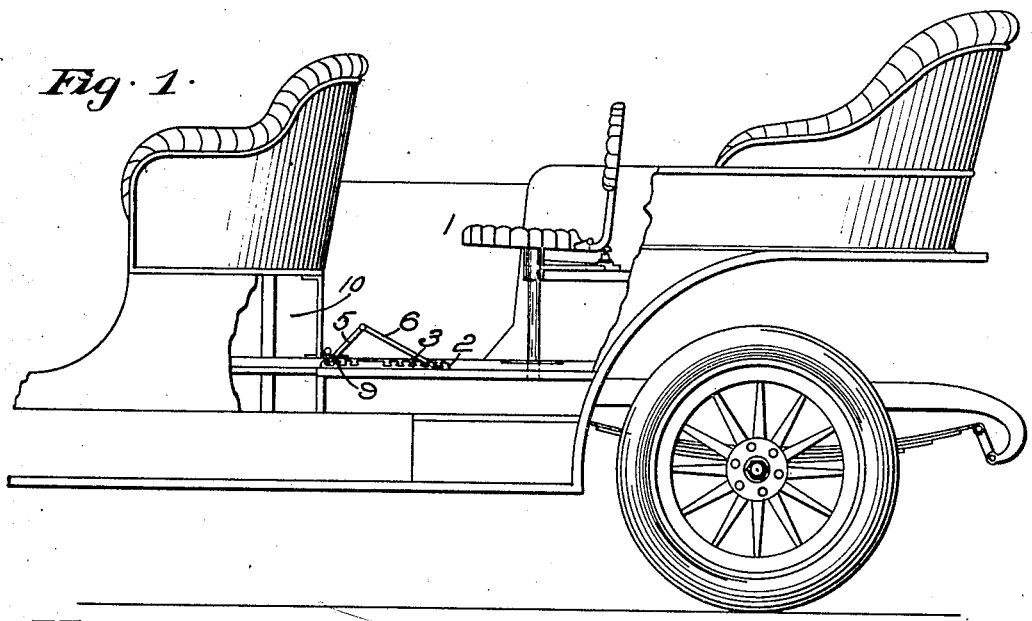
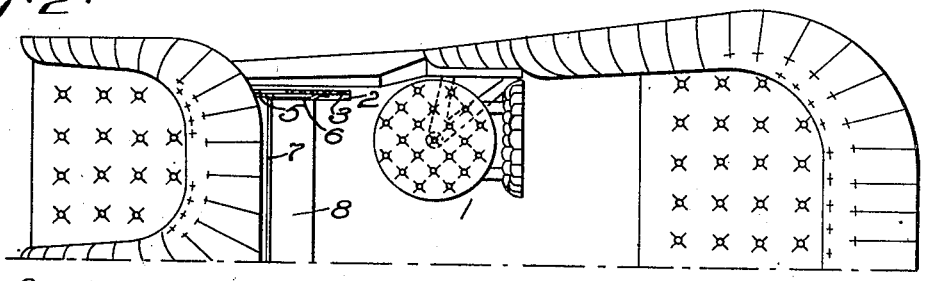
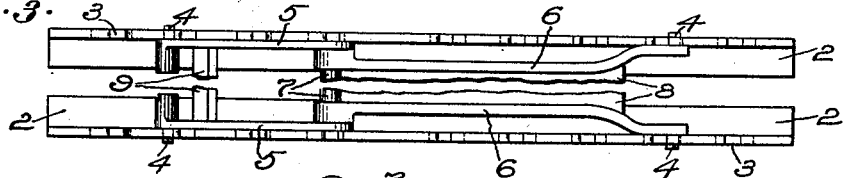
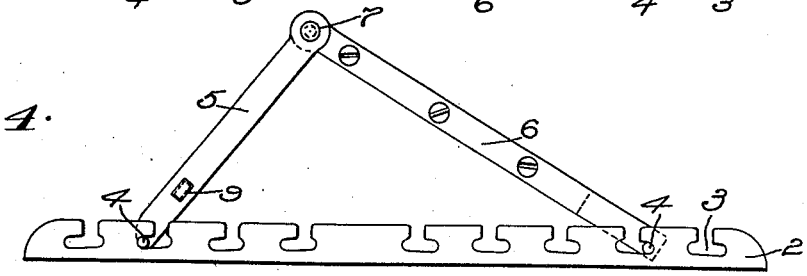
Witnesses:
Jesse G. Holton.
Walter J. Lane.
Inventor:
Charles J. Harris,
by Emery & Booth,
Attys

UNITED STATES PATENT OFFICE.

CHARLES J. HARRIS, OF BRIDGEPORT, CONNECTICUT.

COLLAPSIBLE FOOT-REST FOR VEHICLES.

No. 895,632.  Specification of Letters Patent.  Patented Aug. 11, 1908.

Original application filed November 5, 1906, Serial No. 341,966. Divided and this application filed May 22, 1907.
Serial No. 375,127.

*To all whom it may concern:*

Be it known that I, CHARLES J. HARRIS, a citizen of the United States, residing at Bridgeport, in the county of Fairfield and State of Connecticut, have invented an Improvement in Collapsible Foot-Rests for Vehicles, of which the following description, in connection with the accompanying drawings, is a specification, like letters on the drawings representing like parts.

My invention relates to collapsible foot rests for vehicles having for its object the provision of a collapsible and adjustable foot rest in combination with a carriage body such as that of an automobile.

This invention is a division of my copending application, Serial Number 341,966, Nov. 5, 1906, and will be best understood and appreciated by reference to the following description, when taken in connection with the accompanying drawings, on a single specific embodiment thereof, selected for purposes of illustration, its scope being more particularly pointed out in the appended claims.

In the drawings; Figure 1, is a side elevation of an automobile body showing one form of my invention selected for illustration; Fig. 2, a half section thereof; Fig. 3, a plan, with parts broken away, of the collapsible foot rest detached; and Fig. 4, an end elevation of the same.

Referring to the drawings, and to the particular embodiment of my invention selected for illustration therein, I have represented my invention as applied to a vehicle body, preferably an automobile of the side entrance, tonneau, type, although, obviously my invention is not limited to the specific form or construction of collapsible foot rest nor to its application to an automobile body, since it is equally applicable to carriage bodies and other forms and types.

In the present instance of my invention, I have shown the automobile body as provided with an auxiliary seat, represented at 1, Figs. 1 and 2, to coöperate with which I provide an adjustable and collapsible foot rest, though the latter may be employed with the usual seat. This foot rest is mounted upon the floor of the automobile body and in juxtaposition and to coöperate with said seat, towards which it is adjustable both vertically and horizontally. To this end I provide, at each side of the carriage body, a notched plate 2, having a series of preferably inverted T shaped notches opening at the top edge of the plate and which removably receive laterally projecting pins or lugs 4, respectively provided upon the lower ends of front and back supporting side links 5 and 6, see Fig. 1 (and more particularly Fig. 4). At their opposite or upper ends these side links are hinged together and connected with the similar side links at the opposite side of the foot rest by means of a transversely arranged cross rod 7, the rear links, 6, receiving between their ends and holding between them a foot board 8, the front links being also suitably connected or tied together by a suitable cross bar 9.

The notched supporting plates may obviously be secured in any suitable manner upon or adjacent any convenient portion of the floor or the carriage body but as here shown and preferably, they are arranged at the sills thereof, so as not to obstruct the floor space when the foldable hinged-link foot rest frame is removed.

The end notches of the links are separated a distance substantially equal to the total or combined lengths of the side links, 5, 6, when the latter are arranged end to end or laid out flat, thereby enabling the foot rest to be so adjusted as to lie flat on the carriage floor and in such position retained firmly in place without rattling at the points of contact.

By the construction described, the pins at the ends of the front links may be inserted in any of the corresponding notches at the front portion of the supporting plates and those of the rear links similarly positioned in the notches at the rear portion thereof, thus providing for adjustment or varying both the position and the angle of the foot board, permitting it to be moved longitudinally or horizontally and arranged in higher or lower position and adapting it to the particular needs or comfort of the user. Furthermore, hinging the front and rear links together, as described, provides a convenient means by which the adjustable hinged members of the foot rest may be compactly folded together to permit it to be stored in a suitable storage space beneath one of the seats of the automobile, herein shown as the front seat and as represented at 10.

Referring to Fig. 4, the inverted T shaped notches of said supporting plates 2 are each provided with a vertical portion open at its upper end to receive the adjustable link pin, 4, and to direct the latter into the substantially horizontal portion of said notches. The horizontal portions of the notches are each provided with an overhanging retaining wall to prevent the pins from being removed except intentionally and as the foot rest is moved to bring said pins to an approximately central position in vertical alinement with the vertical portions of said recesses, so that there is no possibility of accidental displacement of the pins nor of their getting out of the notches by the jolting due to the movements of the automobile or from other causes. Said overhanging retaining walls furthermore, as herein shown, are preferably provided with curved and downwardly extending faces, so that the pressure of the foot on the foot board forces the front pins forward and downward and the rear pins rearward and downward into the lower portions of said notches thus to cause the foot rest to bind on the floor covering and also preventing and avoiding any rattling at the points of contact.

While I have shown and described one form of my invention with reference to a particular embodiment thereof, obviously my invention is not limited thereto nor to the specific construction and arrangement of details nor to the application thereof to an automobile, the same being capable of moderation within wide limits without departing from the spirit thereof.

Having thus described one form of my invention, I claim;—

1. A collapsible foot rest for vehicles, comprising a pair of notched plates, a foldable jointed frame consisting of side links pivotally connected to one another and at their opposite ends provided with means for removably engaging said notches, and a foot board secured to the corresponding side links.

2. In a device of the type described, a pair of plates having a series of notches longitudinally arranged thereon, a foldable foot rest frame consisting of a pair of hinged links at each side thereof provided with lugs at their outer ends for removably engaging said notches, and a foot board connected with corresponding links of said frame, said notches having downwardly inclined walls to direct said lugs to a lower position therein by the pressure of the foot on said foot board.

3. A collapsible and foldable foot rest, comprising a pair of plates having a series of notches longitudinally arranged thereon, a foldable foot rest frame consisting of a pair of hinged links at each side thereof provided with lugs at their outer ends removably to engage said notches and a foot board connected with corresponding links of said frame, said notches presenting over hanging retaining walls for preventing accidental displacement of said links thereof thereby to retain the same within said notches.

4. A collapsible and foldable foot rest frame, supporting means, and means for removably attaching said foot rest frame thereto and permitting ready removal and including devices to permit horizontal and angular adjustment of said foot rest frame.

5. An adjustable foot rest, comprising a pair of recessed plates and a collapsible foot support having means for temporarily engaging the recesses of said plates said foot support being readily removable from said plates.

6. An adjustable foot rest, comprising a pair of recessed plates and a collapsible jointed foot support having means for temporarily engaging the recesses of said plates and including a device for preventing the accidental displacement or removal of said engaging means.

7. An adjustable and collapsible foot rest comprising a plurality of disengageable members consisting of a pair of notched plates and a collapsible jointed frame provided with means for temporarily engaging the notches of said plates, said frame being readily removable therefrom.

8. An adjustable and collapsible foot rest comprising a plurality of disengageable members consisting of a pair of notched plates and a collapsible jointed frame provided with means for temporarily engaging the notches of said plates, each of said notches being substantially T shaped and opening at the edge of said plate, the over hanging walls of said notches preventing the disengagement of said engaging means therewith in the adjusted position of said frame.

9. A carriage body having its floor provided with a foot rest in juxtaposition to a carriage seat and having at the sills thereof a pair of notched plates and a collapsible jointed foot rest frame having means for temporarily engaging the notches of said plates, said frame being readily removable from said plates.

10. A carriage body having a pair of notched plates 2 secured at the sills of said body, a foldable foot-supporting frame comprising a foot board 8, links 6 at the sides thereof pivotally connected at one end to links 5 and lugs 4 at the free ends of said links 5 and 6 for removably engaging the notches of said plates, thereby to permit of adjustment of said foot rest to a plurality of different positions.

11. In a collapsible and adjustable foot rest for vehicles, a plate having a plurality of longitudinally arranged notches each provided with a substantially vertical portion and an approximate horizontal portion, the latter extending to both sides of said vertical portion, and a pair of hinged links provided with lugs 4 at their free ends for removably and adjustably engaging said notches and retained in adjusted positions therein by the overhanging walls thereof.

12. A collapsible foot rest for vehicles comprising a pair of oppositely disposed plates, each provided with recesses and a jointed frame consisting of opposite pairs of side links, the members of each pair being pivotally connected together and provided with means for engaging said recesses.

13. A collapsible foot rest for vehicles comprising a pair of oppositely disposed plates, each provided with recesses and a jointed frame consisting of opposite pairs of side links, the members of each pair being pivotally connected together and provided with means for engaging said recesses, and means connecting said pairs of links.

14. A collapsible foot rest for vehicles comprising a base provided with one or more series of recesses and a jointed frame consisting of opposite pairs of side links, the members of each pair being pivotally connected together and provided with means for engaging said recesses.

15. A collapsible foot rest for vehicles comprising a base provided with one or more series of recesses and a jointed frame consisting of opposite pairs of side links, the members of each pair being pivotally connected together and provided with means for engaging said recesses, and means for connecting said pairs of links.

16. A collapsible and foldable foot rest frame and supporting means therefor, said foot rest frame being connected to said supporting means and bodily adjustable horizontally thereon and also angularly adjusted thereon.

In testimony whereof, I have signed my name to this specification, in the presence of two subscribing witnesses.

CHARLES J. HARRIS.

Witnesses:
　VICTOR LINDEROTH,
　THOMAS M. WEBB.